March 12, 1940.    S. T. MARCHINS    2,193,291
SWING LINK SWIVEL
Filed Nov. 18, 1938
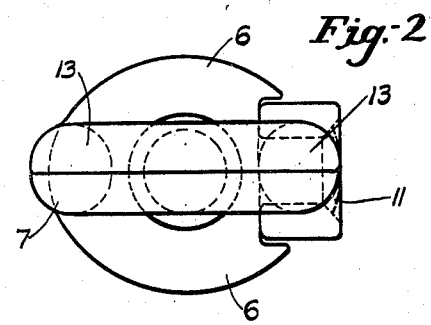
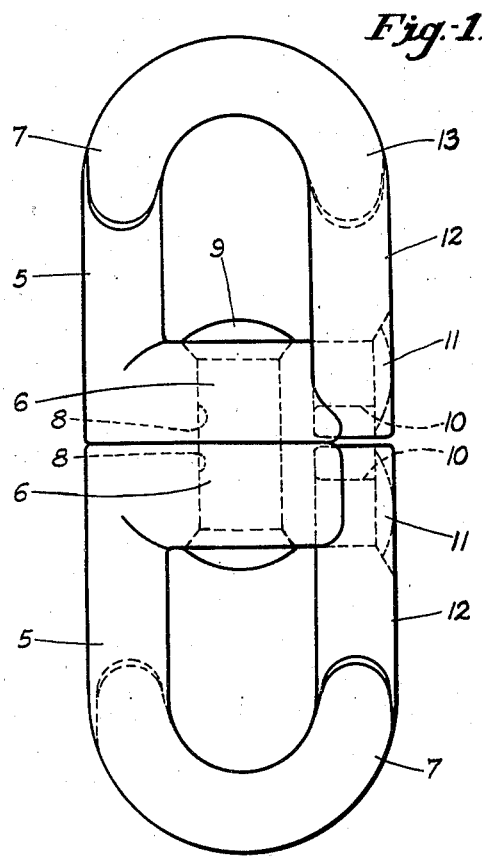
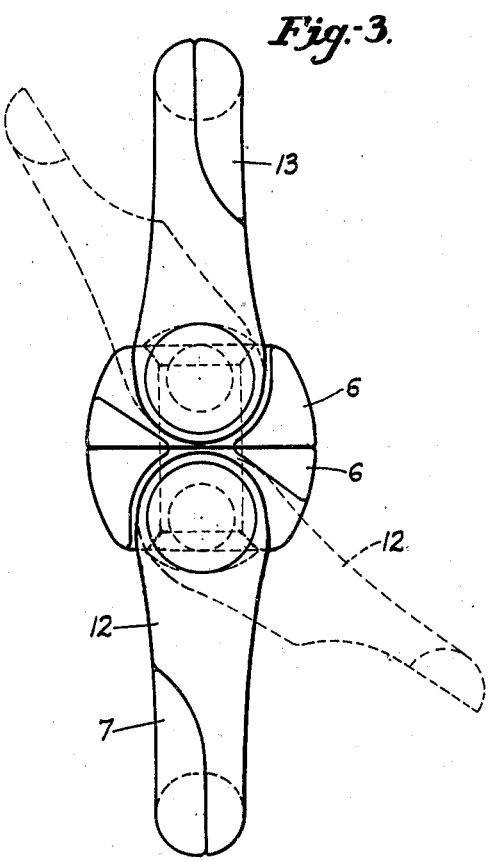
INVENTOR.
STEVEN T. MARCHINS.
BY
ATTORNEYS.

Patented Mar. 12, 1940

2,193,291

UNITED STATES PATENT OFFICE 2,193,291

SWING LINK SWIVEL

Steven T. Marchins, San Pedro, Calif.

Application November 18, 1938, Serial No. 241,281

1 Claim. (Cl. 59—95)

This invention relates to links for ropes, chains, cables, fishing lines and the like, and more particularly to a swing link swivel device.

An object of the invention is to provide a simple, practical and inexpensive device of the character described.

Another object is to provide a novel, strong swivel for swing links for easy connection and disconnection of the ends of ropes, chains, cables and the like to be pulled smoothly through the rings, blocks and pulleys.

A further object is to provide a swing link swivel having simple and secure locking features.

Other objects and advantages will appear and be brought out more fully in the following specification, reference being had to the accompanying drawing, wherein, Fig. 1 is a side view of a swing link swivel embodying my invention.

Fig. 2 is an end view of the same.

Fig. 3 is an edge view of the same.

Referring more particularly to the drawing, my invention comprises a pair of hook members 5 each having a circular base portion 6 and a tapering hook end 7 overlapping the hook member 5. Base members 6 each have a bore 8 adapted to receive a rivet 9 which extends therethrough and by which the members are held together and on which they are adapted to swivel. A bearing pin 10 extends laterally from each base member 6 and has a shouldered head portion 11 by which a releasing hook member 12 is held, the latter being pivoted on bearing pin 10. Hook members 12 have tapered hook portions 13 similar to hook portions 7 and overlapping the hook member 12.

The operation of the invention should be clear from the foregoing description. The hook members 12 may be swung obliquely as shown by the dotted line position of Fig. 3, and will enable the lines to be secured to the hooks 5 and 12 and will be securely held thereby. The rivet 9 enables the hook members to be swiveled thereon, thus preventing tangling and breaking of lines when in use. Furthermore, the construction of base portion 6 having flat opposing faces and held by rivet 9 will enable the device to be carried through rings, ropes, pulleys, and sheaves without breaking the swivel apart or hooking any object pulled through.

Furthermore, the swivel link will prevent kinks from forming in the lines or ropes and will thus facilitate passage of the same around pulleys and through any links or over any obstructing objects. The swing link construction as described permits simple and easy connection and disconnection of ropes, chains or the like, and is particularly adaptable to chains with which it forms a perfect link by having the separable hook portions as well as the swivel rivet.

It will be clear from the drawing that all exterior portions of the link are straight or smooth curved so that no catching or snagging of the link will occur on any object with which it is brought in contact.

Having described my invention, what I claim is:

A device of the character described, comprising two hook members having broad flat abutting solid bases connected together by a longitudinal bolt and adapted to rotate in respect to each other, each base having a hook pivoted in a recess in the sides of the base out beyond the abutting faces of the bases and flush with the bases, their outer ends overlapping the first mentioned hook members carried by the bases.

STEVEN T. MARCHINS.